(12) United States Patent
Rahon (10) Patent No.: US 7,621,254 B2
(45) Date of Patent: Nov. 24, 2009

(54) INTERNAL COMBUSTION ENGINE WITH TOROIDAL CYLINDERS

(76) Inventor: John R. Rahon, 2052 Ardley Rd., North Palm Beach, FL (US) 33408

( * ) Notice: Subject to any disclaimer, the term of this patent is extended or adjusted under 35 U.S.C. 154(b) by 0 days.

(21) Appl. No.: 11/938,597

(22) Filed: Nov. 12, 2007

(65) Prior Publication Data

US 2009/0120407 A1    May 14, 2009

(51) Int. Cl.
| F02B 53/04 | (2006.01) |
| F02B 53/10 | (2006.01) |
| F01C 1/08 | (2006.01) |
| F01C 1/24 | (2006.01) |
| F04C 2/00 | (2006.01) |
| F04C 18/00 | (2006.01) |
| F16J 15/447 | (2006.01) |

(52) U.S. Cl. ............... 123/221; 123/206; 123/229; 418/195; 277/414

(58) Field of Classification Search ........... 123/221, 123/206, 228–229, 233; 418/195–196; 277/411–415, 277/940

See application file for complete search history.

(56) References Cited

U.S. PATENT DOCUMENTS

| 760,631 | A | * | 5/1904 | Jewell | ............ 123/221 |
| 822,952 | A | * | 6/1906 | Jewell | ............ 123/221 |
| 1,305,133 | A | * | 5/1919 | Little | ............ 418/195 |
| 2,046,989 | A | * | 7/1936 | Winter | ............ 418/36 |
| 2,674,982 | A | * | 4/1954 | McCall | ............ 123/221 |
| 3,012,551 | A | * | 12/1961 | Renshaw | ............ 123/221 |
| 3,302,625 | A | * | 2/1967 | Cunningham | ............ 418/36 |
| 3,481,313 | A | * | 12/1969 | Isstas | ............ 123/221 |
| 3,502,054 | A | * | 3/1970 | Hambric | ............ 123/221 |
| 3,841,276 | A | * | 10/1974 | Case | ............ 123/221 |
| 3,916,054 | A | * | 10/1975 | Long et al. | ............ 277/414 |
| 4,005,682 | A | * | 2/1977 | McCall et al. | ............ 123/221 |
| 4,013,046 | A | * | 3/1977 | Kemp | ............ 123/229 |
| 4,022,481 | A | * | 5/1977 | Long et al. | ............ 277/414 |
| 5,125,379 | A | * | 6/1992 | Linville | ............ 123/221 |
| 5,178,529 | A | * | 1/1993 | Obrist et al. | ............ 277/411 |
| 6,546,908 | B1 | * | 4/2003 | Pekau | ............ 123/206 |
| 6,588,395 | B2 | * | 7/2003 | DeFazio | ............ 123/221 |
| 6,880,494 | B2 | * | 4/2005 | Hoose | ............ 123/245 |

* cited by examiner

*Primary Examiner*—Thai Ba Trieu
(74) *Attorney, Agent, or Firm*—McHale & Slavin, P.A.

(57) ABSTRACT

The instant invention provides a torodial internal combustion engine with lengthened pistons that move through three perpendicularly intersecting torodial cylinders. The engine includes one central power ring and a pair of charge rings which intersect opposite quadrants of the power ring at right angles to supply a fuel/air mixture to the power ring for combustion. The charge rotors are connected to the power rotor, through a gear-train, so that all of the rotors rotate at the same rate. The fuel/air mixture is combusted within a combustion chamber formed entirely within the power ring.

12 Claims, 6 Drawing Sheets

INTERNAL COMBUSTION ENGINE WITH TOROIDAL CYLINDERS

RELATED APPLICATIONS

This application is related to U.S. Disclosure Document No. 600415 entitled The Rayhoon Engine filed May 9, 2006, the contents of which are incorporated herein in their entirety.

FIELD OF THE INVENTION

This invention pertains generally to machines such as engines, pumps and the like and more particularly, to a positive displacement internal combustion engine with toroidal shaped cylinders.

BACKGROUND OF THE INVENTION

For more than a century, internal combustion engines have been relied upon as a principal source of power in a variety of applications. Of those engines, the most widely used are the reciprocating piston engines which are found in automobiles or other forms of transportation, as well as a variety of industrial and consumer applications. Such engines can be built in a variety of sizes, types and configurations depending on the power requirements of a particular application. Generally, the engine configuration affects the physical size and smoothness of the engine. Common configurations include the straight or inline configuration, the more compact V configuration, and the wider but smoother flat or boxer configuration. Aircraft engines can also adapt a radial configuration which allows more effective cooling. More unusual configurations, such as "H", "U", "X" or "W" have also been used with success. Cylinder quantities of these configurations range from a single cylinder up to thirty-two cylinders or more.

Types of reciprocating engines generally include the hot bulb engine, the crude oil engine, the four stroke engine, the six stroke engine, the two stroke engine and the diesel engine. The basic components of a typical reciprocating engine are one or more cylinders, and for each cylinder there is a spark plug (except diesel engines), a piston and a crank. A single sweep of the cylinder by the piston in an upward or downward motion is known as a stroke. The most common engine in use today, the four stroke engine requires two or more complete rotations of the crank shaft to complete the four strokes of the engine. The four strokes refer to intake, compression, power and exhaust strokes that occur during two crank shaft rotations for working cycle of the Otto cycle and diesel engines. The two stroke cycle of an internal combustion engine differs from the more common four stroke cycle by completing the same four processes: intake, compression, power and exhaust in only two strokes of the piston rather than four. This is accomplished by using the beginning of the compression stroke and the end of the power stroke to perform the intake and exhaust functions. This allows a power stroke for every revolution of the crank, instead of every second revolution as in a four stroke engine.

The hot bulb engine shares its basic layout with n early all other internal combustion engines, in that it has a piston inside a cylinder connected to a flywheel via a connecting rod and crankshaft. The flow of gases through the engine is controlled by valves. The majority of hot bulb engines operate on the standard four stroke cycle having an induction stroke, a compression stroke, a power stroke and an exhaust stroke. The main feature of the hot bulb engine is the vaporizer or hot bulb, a chamber usually cast into the engine block and attached to the main cylinder by a narrow opening. Prior to starting the engine from a cold temperature, this vaporizer is heated externally by a blow torch or slow burning wick for as much as a half hour. The engine is then turned over, usually by hand, but sometimes compressed air or an electric motor. As air is drawn into the cylinder through the intake valve, the piston descends for the induction stroke. During the same stroke, fuel is sprayed into the hot bulb through a nozzle by a mechanical jerk pump. Through the action of the sprayer and the heat of the hot bulb, the fuel instantly vaporizes. The air in the cylinder is then forced through the top of the cylinder as the piston rises for the compression stroke, through the opening into the hot bulb where it is compressed, raising the temperature of the air. The vaporized fuel mixes with the compressed air and ignites due to the heat of the compressed air and the heat applied to the hot bulb prior to starting. The resulting pressure drives the piston down for the power stroke. The piston's action is converted to a rotary motion by the crankshaft flywheel assembly, to which equipment can be attached for work to be performed.

The crude oil engine is a type of internal combustion engine that is similar to the hot bulb engine. A crude oil engine can be driven by all sorts of oils such as engine waste oil and vegetable oils. Like hot bulb engines, crude oil engines are mostly used as stationary engines or in boats. They can be run for a very long time, because they are low RPM and are dimensioned for constant running.

Another configuration of the reciprocating engine includes the Bourke engine which has two opposed cylinders with the pistons in a scotch yolk mechanism. The use of the scotch yolk reduces vibration from the motions of the connection rod.

Yet another variation of the reciprocating engine is referred to as the six stroke engine. The six stroke engine captures the waste heat from the four stroke auto cycle and uses it to power an additional power and exhaust stroke of the piston. Designs either use steam or air as a working fluid for the additional power stroke. As well as extracting power, the additional stroke cools the engine and removes the need for a cooling system, making the engine lighter and giving about 40% increased efficiency over the Otto cycle.

Still another variation of the reciprocating engine is called the Twingle engine. The Twingle engine is a two stroke engine, usually of small capacity and gasoline burning. It uses two pistons, one of which controls the inlet ports and the other the exhaust ports. These run in two parallel cylinder bores but share a single combustion chamber, spark plug and cylinder head.

Still yet another alternative version of the reciprocating engine includes the swashplate engine. The swashplate is a type of reciprocating engine that replaces the common crankshaft with a circular plate. Pistons press down on a circular plate in a circular sequence, forcing it to nutate around its center. The key advantage of this design is that the cylinders are arranged in parallel around the edge of the plate and possibly on either side of it as well, and are aligned with the output shaft of the engine rather than at 90 degrees as in crankshaft engines.

Even though the reciprocating engine is available in so many configurations, the design still suffers from numerous disadvantages. One major disadvantage is that the energy released by combustion is converted to work via linearly moving pistons and is then converted to rotational work output when it is transmitted to the crankshaft. This transfer of work output from linear to rotational motion is inherently inefficient for several reasons. For one, the slider crank mechanism that receives the work output from the piston is not at an optimum position for producing high torque on the crankshaft when pressure in the combustion chamber peaks and, consequently, only a portion of the energy generated by the combustion process is transmitted to the crankshaft, with the rest being dissipated in side thrust resulting in frictional work. Additional energy is wasted changing the directional motion of the piston, while the energy directs the piston in a downward motion, the piston must return to the top of the cylinder to complete another cycle.

Numerous alternatives to the reciprocating engine have been proposed. One such alternative is the Wankel rotary engine. In the Wankel engine, the four strokes of a typical Otto cycle occur in the space between a rotor, which is roughly triangular, and the inside of a housing. In the basic single rotor Wankel engine, the oval-like epitrochoid-shaped housing surrounds a three sided rotor bracket similar to a Reuleaux triangle. The central drive shaft, also called an eccentric shaft or E-shaft, passes through the center of the rotor and is supported by bearings. The rotor both rotates around an offset lobe on the E-shaft and makes orbital revolutions around the central shaft. Seals at the corners of the rotors seal against the periphery of the housing, dividing it into three moving combustion chambers. Fixed gears mounted on each side of the housing engage with ring gears attached to the rotor to ensure proper orientation as the rotor moves.

Another alternative engine design is the Sarich orbital engine. The Sarich orbital engine is a type of internal combustion engine, featuring rotary rather than reciprocating motion of its internal parts. It differs from the conceptionally similar Wankel engine by using a shaped rotor that rolls around the interior of the engine, rather than having a trilobular rotor that spins in place. The advantage is that there is no high speed contact area with the engine walls, unlike the Wankel where edge wear is a problem. However, the combustion chambers are divided by blades which do have contact with both the walls and the rotor, and are said to have been difficult to seal due to the perpendicular intersection with the moving impeller.

Yet another alternative internal combustion engine is the trochilic engine. The trochilic engine is composed of two mirror image gull wing segments intermeshed and rotating about a common axis. Varying the relative segment velocities in rotation forms four variable quadrants. The quadrants are functionally a four cylinder engine requiring no mechanically driven valves. Each segment is internally connected to a rotating gear cage that converts the undulating piston motion to a linear rotating output shaft. The segmented piston has a preferred direction of rotation imposed by the mechanically leveraged action of the gear cage.

Another known engine is the toroidal engine design. The toroidal engine design is a form of internal combustion engine that features pistons that rotate within a torodial space. Generally in a toroidal engine, the engine moves pistons on different rotors relative to each other to form combustion chambers of variable volume in a torodial cylinder. The pistons move in a stepwise fashion, and with the pistons on one rotor traveling a predetermined distance while the pistons on the other rotor remain substantially stationary. Fuel is drawn into a chamber as one of the pistons defining a chamber moves away from the other, and then compressed as a second piston moves towards the first. Combustion of the fuel drives the first piston away from the second, and the exhaust gasses are then expelled from the cylinder by the second piston moving again towards the first. An output shaft is connected to the rotors in such a manner that the shaft rotates continuously while the rotors and pistons move in their stepwise fashion. The engine fires as many as 16 times in one revolution of the crankshaft, 32 times on two. By comparision, a standard V8 fires four times per crankshaft revolution, one quarter the number of the torodial engine.

One drawback to the prior art toroidal engines is the requirement that the pistons move in a stepwise fashion. Stopping and restarting the piston movement requires a substantial amount of energy. Therefore, what is needed in the art is an engine with a toroidal shaped power cylinder wherein the pistons move in a continuous motion without the need for the stepwise movement as seen in the prior art. The engine should include one or more charge rings constructed and arranged to supply a fuel air charge to the power ring for combustion.

OBJECTS AND SUMMARY OF THE INVENTION

Therefore, it is an object of the invention to provide a new and improved internal combustion engine.

It is another object of the invention to provide an internal combustion engine which overcomes the limitations and disadvantages of the prior art.

Still another object of the present invention is to provide an internal combustion engine that provides superior performance and reduced emissions.

It is a further object of the present invention to provide an internal combustion engine that has fewer moving parts, is lighter in weight and smaller in size than a conventional engine of comparable power.

It is yet a further object of the present invention to provide an engine in which the mechanical forces are dynamically balanced and the thermal stress is evenly distributed.

It is still yet a further object of the present invention to provide an internal combustion engine that requires fewer and simpler seals that has reduced requirements for cooling and lubrication.

The above cited objects have been achieved by providing a torodial internal combustion engine with lengthened pistons that move through three perpendicularly intersecting torodial cylinders. The torus of each cylinder is formed of two substantially similar rings, a front ring member and a rear ring member. The ring members which form each toroidal cylinder are sealed along the seams to form the complete torus. The torus thus forms the chamber walls and the faces of the pistons form the boundaries within the torus. The engine includes one central power ring and a pair of charge rings which intersect opposite quadrants of the power ring at right angles to supply a fuel/air mixture to the power ring for combustion. One set of two pistons rotate within the power ring connected to opposite sides of a rotor while one set of two pistons, connected to charge rotors, rotate around each of two charge rings which feed the fuel and air charges to the power ring for combustion. The charge rotors are connected to the power rotor through a gear-train, so that all of the rotors rotate at the same rate. In operation, rotation of the charge rotors causes the pistons to move within the charge ring, allowing a charge of fresh air to be drawn into the charge ring. Further rotation of the engine causes the pistons of the power ring to cross the toroidal cylinders of the charge rings causing the air charge to be compressed against a side surface of the power piston and fuel is injected into the compressed charge of air. As the piston rotation progresses, the compressed fuel/air mixture is transferred to the power ring whereby the sides of the charge pistons and the rear surface of the power pistons form a pair of combustion chambers. A pair of spark plugs mounted in proximity to the combustion chambers ignite the fuel/air mixture expanding the charges to drive the power pistons further around the ring, causing exhaust gasses on the front sides of the power pistons to be expelled through ports or valves to an exhaust manifold, completing the cycle. The power rotor is suitably keyed to an output shaft to allow the rotational output of the power rotor to be used for useful work. In addition, the construction of the engine is such that multiple engines can be coupled to the output shaft to increase the power provided for work.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

While the present invention is susceptible of embodiment in various forms, there is shown in the drawings and will hereafter be described a presently preferred embodiment with the understanding that the present disclosure is to be considered an exemplification of the invention and is not intended to limit the invention to the specific embodiments illustrated.

Figure 1:
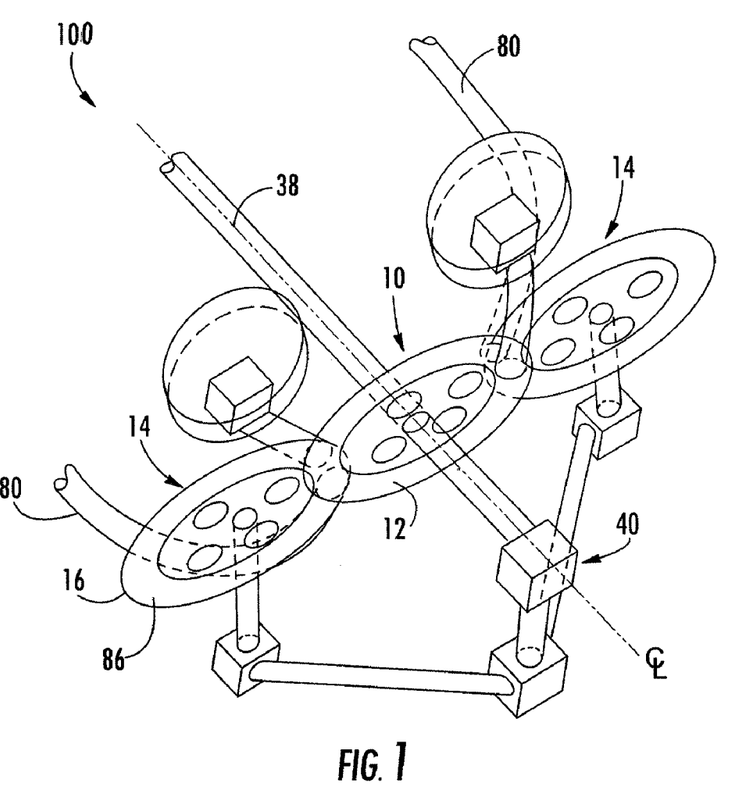
FIG. 1 is a perspective view of the internal combustion engine with toroidal shaped cylinders of the instant invention.
Figure 2:
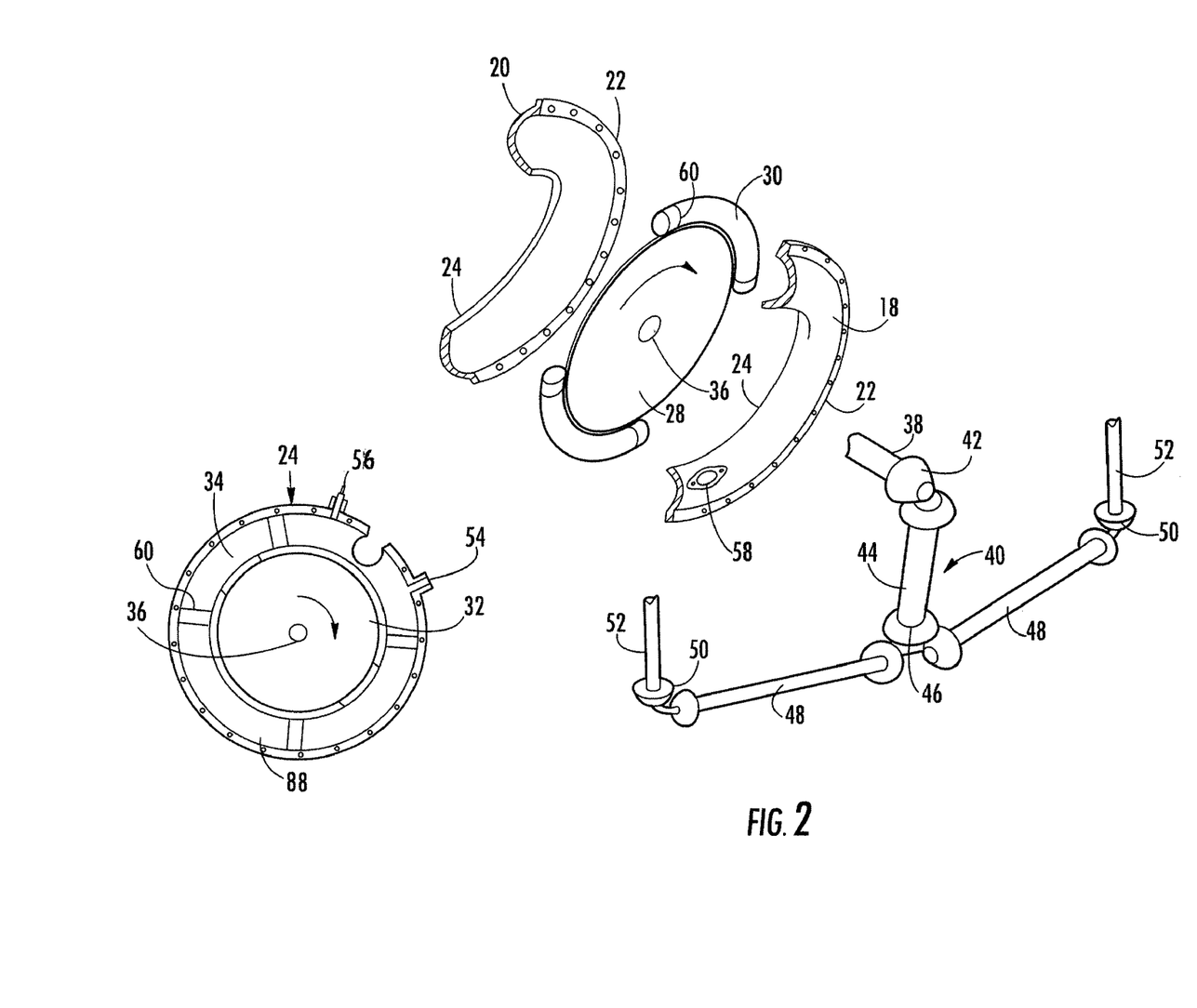
FIG. 2 is a partial exploded view of the power ring, one charge ring and one embodiment of the gear-train.

Referring to FIGS. 1 and 2, the internal combustion engine with torodial cylinders (100) is illustrated. In general, the engine includes a vertically oriented central power ring (10) having a torodial shaped cylinder (12). The power ring (10) is intersected by a pair of horizontally oriented charge rings (14) also having torodial shaped cylinders (16). The charge rings are positioned to intersect opposite quadrants of the power ring (10) at substantially right angles. The power ring (10) is comprised of two substantially similar halves, one being a front engine ring member (18) and the other being a rear engine ring member (20). Each ring member includes a c-shaped cross section with a first seam edge (22) and a second seam edge (24). The first seam edge (22) of the front engine ring member (18) is sealable with the first seam edge (22) of the rear engine ring member (20). The seal may include an O-ring, gasket or other well known means of sealing the ring members together to prevent the loss of gasses therefrom. The second seam edge (24) of the front (18) and rear (20) ring members each includes a sealing ring (26) or (76) (see FIGS. 5B and 5C) that is constructed and arranged to sealably cooperate with opposite faces of an engine ring rotor (28) so as to form the torus shaped cylinder and prevent the loss of gasses from the cylinder.

Each of the charge rings (14) are constructed for sealable attachment to the power ring (10) at a substantially right angle so that the charge rings can supply fuel/air charges to the power ring (10) for combustion. In the preferred embodiment, the charge rings are secured to the power ring at opposite quadrants thereof. Like the power ring (10), each of the charge rings (14) also includes a front charge ring member (86) and a rear charge ring member (88) sealably connected in the same fashion as the power ring member 10. Within the charge ring is a charge rotor (32). The charge rotor also includes a pair of charge pistons (34) mounted to the charge rotor on opposite quadrants thereof. The charge pistons (34) and the power ring pistons (30) each include sealing rings (60) constructed and arranged to create a seal between the inner wall of the ring members and the side of the pistons. The central portion of each charge rotor (32) and power rotor (28) includes an aperture (36) that may include splines, keyways, clamps or other means of connection to a shaft for timing and output purposes.

A gear train (40) is generally constructed and arranged to control the timing movement between the power rotors (10) and the charge rotors (14). The gear train preferably includes a plurality of bevel gears and shafts arranged to allow the timed operation of the power and charge rotors. In the preferred embodiment, the gear train includes the output shaft (38) connected to a first set of bevel gears (42) which connect to the line shaft (44) which extends to the splitter bevel gear (46) which allows right angle drives (48) extending outwardly to the charge drive bevel gears (50) and the charge drive shafts (52). The charge drive shafts (52) extend through the central apertures (36) and the charge rings (14) to couple the charge rings to the power ring. In the preferred embodiment, the gear ratio of the gear train is 1:1 so that for each degree of rotation of the power ring (10) the charge rings each also rotate one degree. Also in the preferred embodiment, the output shaft (38) extends through the power rotor (10) for coupling the engine to a transmission or the like for using power produced by the engine. It should also be noted that additional power rings could be secured along the same output shaft for increasing the useable power.

Still referring to FIGS. 1 and 2, the charge rings (14) each include an intake port (54) and a fuel supply means (56). The fuel supply means is preferably a fuel injector (56) connected to a fuel injection system, but other means of supplying fuel could also be used without departing from the scope of the invention. Such means may include, but should not be limited to carburetors and gas injection systems for fuels such as propane, natural gas and the like. The power ring preferably includes the exhaust port (58) which is utilized to exhaust the combusted fuel and air mixture. In a most preferred embodiment an exhaust manifold (80) is secured to the exhaust port to route the exhaust away from the engine as is known in the art.

Figure 3A:
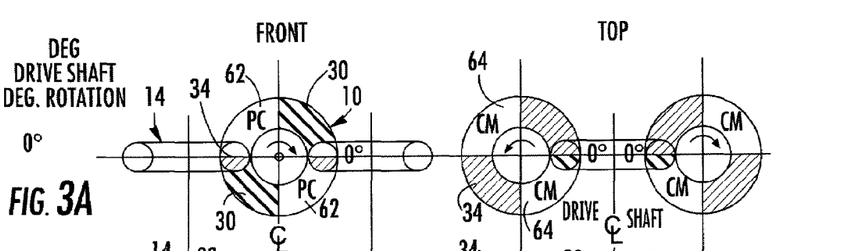
FIG. 3A is a schematic illustrating the cycle sequence of the instant invention at 0 degrees of rotation.

Referring to FIGS. 3A through 3E, various schematics illustrating the cycle sequence of the instant invention are illustrated. Referring to FIG. 3A, the instant invention is shown at a 0° rotation. In this position, products of combustion (62) are illustrated to be on the rear side of the power piston (30). It can also be seen that the charge pistons (34) are intersectably crossing the torodial cylinder of the power ring (10). It can also be seen in the top view that the next charge mixture (64) is staged on the front side of the charge piston (34) for transfer to the power ring (10).

Figure 3B:
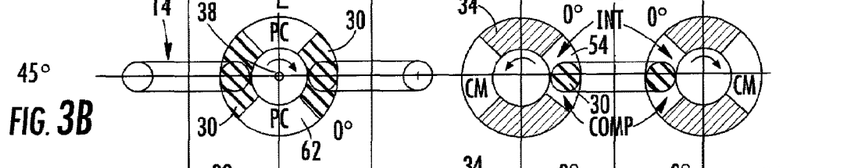
FIG. 3B is a schematic illustrating the cycle sequence of the instant invention at 45 degrees of rotation.

FIG. 3B illustrates rotation of the power rotor and the charge rotors through about 45°. In this position, intake of fresh air through the intake ports (54) is illustrated. Also illustrated in this position is compression of the preexisting charge mixture against the side of the power piston (30).

Figures 3C, 3D:
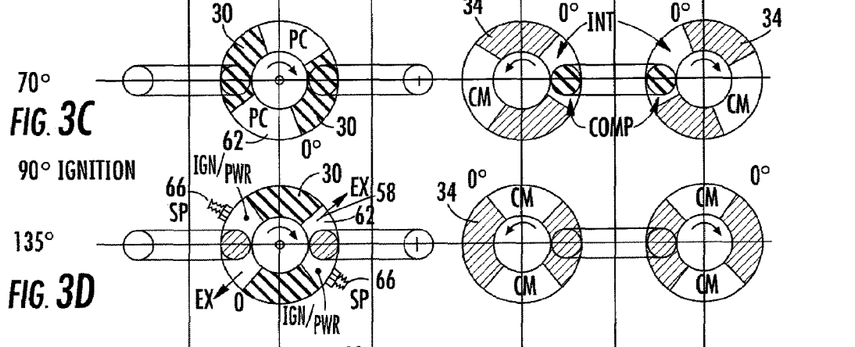
FIG. 3C is a schematic illustrating the cycle sequence of the instant invention at 70 degrees of rotation.
FIG. 3D is a schematic illustrating the cycle sequence of the instant invention at 135 degrees of rotation.

FIG. 3C illustrates rotation of the power and charge rotors through approximately 70°, showing further compression and further intake. At approximately 90° rotation, the compressed fuel mixture is transferred to the power ring, thereafter the charge piston (34) crosses the torodial space of the power ring and combustion starts at about 90° rotation.

Referring to FIG. 3D, rotation of the power and charge rotors through approximately 135° of rotation is illustrated. At this position, combustion of the fuel/air mixture is underway whereby the spark plugs (66) have ignited the fuel/air mixture driving the power piston (30) in a clockwise direction. It should be noted that the combustion chamber is formed between the side of the charge piston (34) and the rear side of the power piston (30). It should also be noted that the combusted gases of the prior ignition power stroke (62) are being exhausted through exhaust port (58) by the pressure created between the front side of the power piston (30) and the side of the opposite charge piston (34).

Figure 3E:
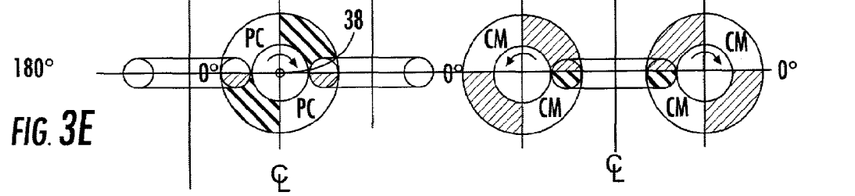
FIG. 3E is a schematic illustrating the cycle sequence of the instant invention at 180 degrees of rotation.

Referring to FIG. 3E, rotation of the power and charge rotors through approximately 180° is illustrated. In this position a complete combustion cycle has occurred and the cycle starts over and is repeated continuously to create rotation of the power rotor (28) which rotates output shaft (38) to deliver usable power for use in machinery, vehicles or the like.

Figure 4:
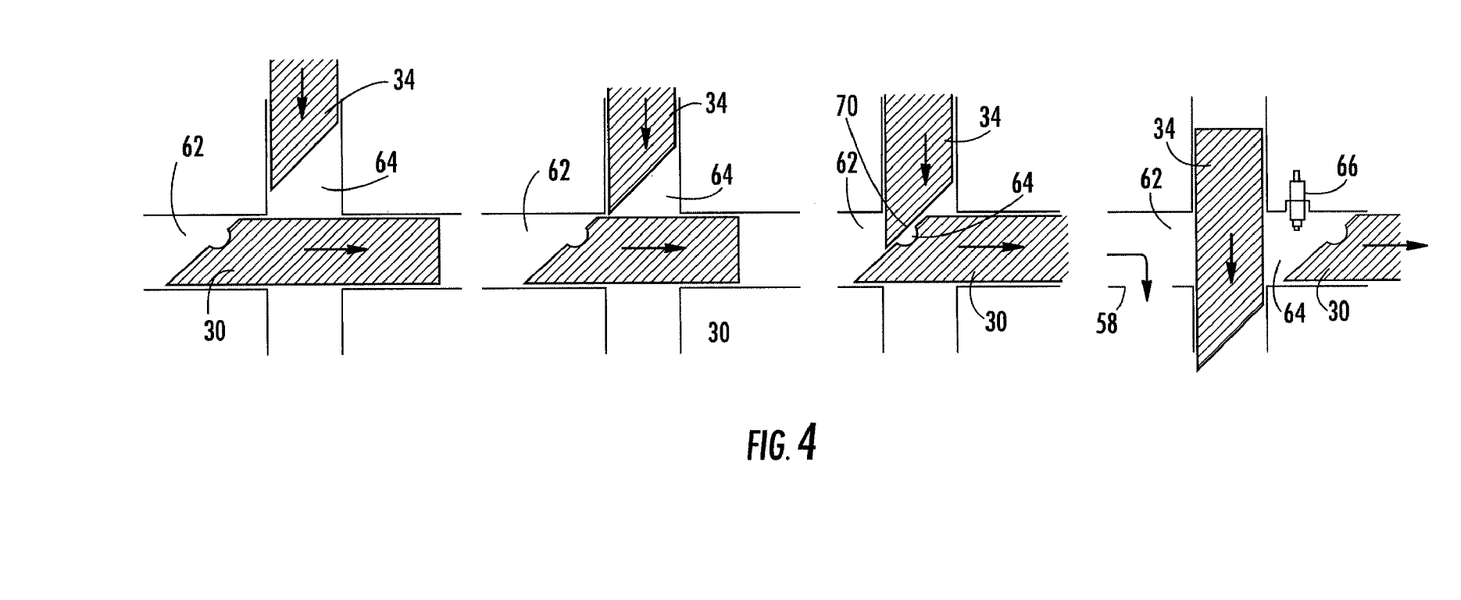
FIG. 4 is a schematic illustrating the transfer of the fuel/air mixture from a charge ring to the power ring.

Referring to FIG. 4, a schematic illustrating the transfer of the fuel/air mixture from the charge ring to the power ring is shown. As can be seen in FIG. 4, the charge piston (34) is in motion to compress the fuel air mixture (64) against the side of the power piston (30). Further rotation further compresses the air/fuel mixture as the pistons come together in a crossing motion, transferring the compressed fuel air mixture to a pocket (70) which is preferably provided in the rear face of power piston (30). The pistons further cross causing or creating the combustion chamber between the side of the charge ring piston (34) and the rear face of the power piston (30) which is ignited by a spark plug (66) further driving the pistons and their circular motion. It should be noted that at the same time as the pistons further cross, the exhaust gases (62) are forced through the exhaust port (58) and exhausted to the atmosphere through and exhaust manifold.

Figure 5A:
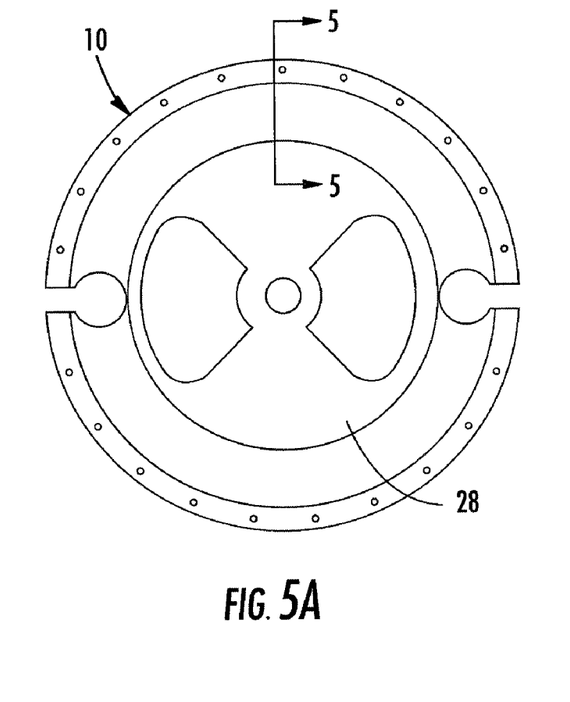
FIG. 5A is front view of the power ring.
Figure 5B:
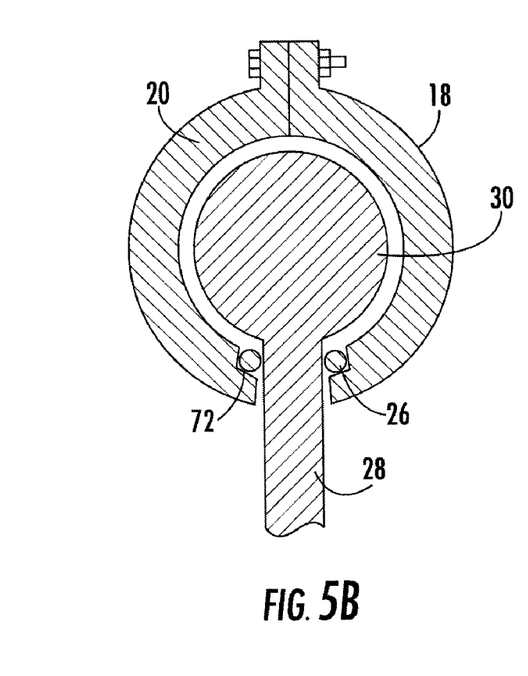
FIG. 5B is a section view taken along lines 5-5 of FIG. 5A.
Figures 5C, 6:
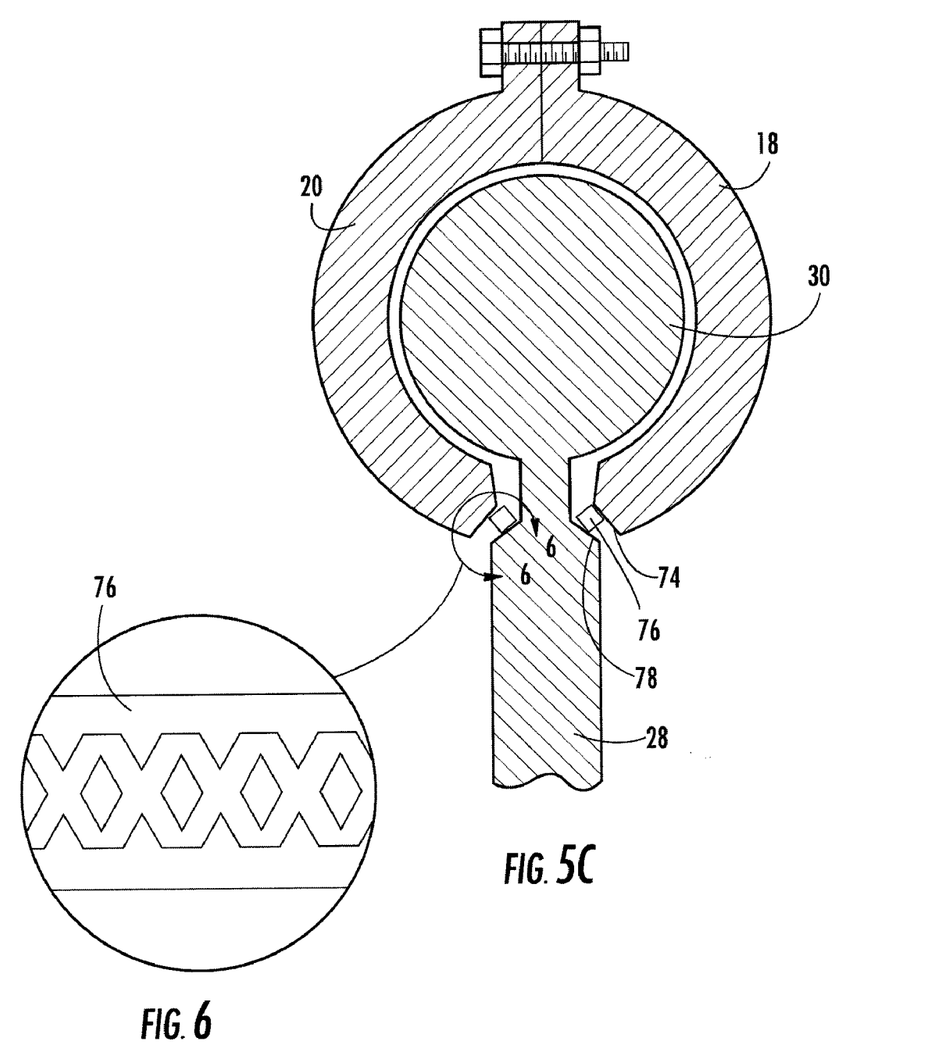
FIG. 5C is a section view taken along lines 5-5 of FIG. 5A.
FIG. 6 is a section view taken along lines 6-6 of FIG. 5C.

Referring to FIGS. 5A and 5B, a complete ring assembly is illustrated. A cross section taken along lines 5-5 in FIG. 5A shows that the sealing ring (26) may be in the form of an o-ring which is compressed between shoulders (72) formed into the front and rear portions of one of the rings; or alternatively as shown in FIG. 5C, the front and rear portions of the power ring or charge rings may include a beveled edge (74) that cooperates with a honeycomb sealing ring (76). The honeycomb sealing ring, as further illustrated in FIG. 6, includes a central portion that is compressible to create a seal between the beveled edge of the ring members (74) and a beveled edge (78) of the rotors. Either mechanism provides a complete seal which forms the torodial shaped cylinder.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An internal combustion engine comprising:
a central power ring having a toroid shaped cylinder, a power rotor mounted for rotation with respect to said central power ring, said power rotor having a pair of toroid shaped power pistons secured to opposite quadrants of said power rotor so that said power pistons are positioned to rotate within said central power ring cylinder, said central power ring intersected by a pair of charge rings having toroid shaped cylinders, said charge rings positioned to intersect opposite quadrants of said central power ring at substantially right angles, each of said charge rings including a charge rotor having a pair of toroid shaped charge pistons secured to opposite quadrants of said charge rotor so that said toroid shaped charge pistons are positioned to rotate within each respective said charge ring cylinder, a rear face of each said charge piston including a pocket for containing and transferring said compressed air and fuel charge to said central power ring, said power rotor and said charge rotors being connected together so that said charge rings rotate through an angle of rotation that is mechanically controlled by an angle of rotation of said power rotor, whereby a pair of combustion chambers are formed completely within said central power ring between a side surface of each of said charge pistons and a face of each power piston, whereby each of said charge rings is constructed and arranged to draw in fresh air through an intake port and compress said fresh air, a fuel supply means for introducing fuel to said compressed fresh air, whereby said compressed fuel and air charges is transferred to said respective combustion chamber, whereby a spark plug is positioned in each of said combustion chambers to ignite said air fuel mixture in each of said combustion chambers to cause rotation of said power rotor, thereby forcing said combustion chamber to increase in volume, and whereby exhaust gas from a previous combustion is positioned on an opposite side of each said power piston forcing said exhaust gas out through an exhaust port positioned in said central power ring.

2. The internal combustion engine of claim 1 wherein said central power ring is constructed of two substantially similar halves, one being a front engine ring member and an other being a rear engine ring member, each ring member having a substantially C-shaped cross-section with a first seam edge, a second seam edge, and opposite continuous faces of said power rotor therebetween, wherein said first seam edge of said front engine ring member is sealable with said first seam edge of said rear engine ring member, and said second seam edge of said front and said rear engine ring members each includes a sealing ring constructed and arranged to sealably cooperate with opposite faces of said power rotor so as to form said toroid shaped cylinder of said central power ring.

3. The internal combustion engine of claim 2, wherein said second seam edge of said front engine ring member and rear engine ring member of said central power ring each have a seam edge including a sealing ring constructed and arranged to cooperate with opposite continuous side faces of said power rotor so as to form a seam that seals against gas leakage when combustion force is applied against said seam.

4. The internal combustion engine of claim 3, wherein said seal includes a compressible honeycomb shape.

5. The internal combustion engine of claim 3, wherein said continuous side faces are beveled to cooperate with said sealing ring.

6. The internal combustion engine of claim 1 wherein each of said charge rings are constructed of two substantially similar halves, one being a front charge ring member and an other being a rear charge ring member, each charge ring member having a substantially C-shaped cross-section with a first seam edge, a second seam edge, and an engine ring wall therebetween, wherein said first seam edge of said front charge ring member is sealable with said first seam edge of said rear charge ring member, and said second seam edge of said front and said rear charge ring each includes a sealing ring constructed and arranged to sealably cooperate with opposite faces of a charge rotor so as to form said toroid shaped cylinder.

7. The internal combustion engine of claim 1 wherein said two combustion chambers are spaced equidistant from each other around said central power ring and said combustion takes place essentially simultaneously and completely within said combustion chambers.

8. The internal combustion engine of claim 1 wherein said central power ring includes a pair of exhaust ports, whereby said exhaust gas is forced out of said central power ring through said exhaust ports during rotation of said power rotor.

9. The internal combustion engine of claim 1, wherein said controlled rotation is controlled via a gear train linked between said power rotor and said charge rotors.

10. The internal combustion engine of claim 1, wherein said power rotor is secured to an output shaft that is inserted through an opening formed by an inner circumferential wall of said power rotor.

11. The internal combustion engine of claim 1, wherein said power pistons have a length dimension that extends in a direction of rotation of said power piston in said central power ring.

12. An internal combustion engine comprising:
a central power ring having a toroid shaped cylinder, a power rotor mounted for rotation with respect to said central power ring, said power rotor having a pair of toroid shaped power pistons secured to opposite quadrants of said power rotor so that said power pistons are positioned to rotate within said central power ring cylinder, said central power ring intersected by a pair of charge rings having toroid shaped cylinders, said charge rings positioned to intersect opposite quadrants of said central power ring at substantially right angles, each of said charge rings including a charge rotor having a pair of toroid shaped charge pistons secured to opposite quadrants of said charge rotor so that said toroid shaped charge pistons are positioned to rotate within each respective said charge ring cylinder, said power rotor and said charge rotors being connected together so that said charge rings rotate through an angle of rotation that is mechanically controlled by an angle of rotation of said power rotor, whereby a pair of combustion chambers are formed completely within said central power ring between a side surface of each of said charge pistons and a face of each power piston, whereby each of said charge rings is constructed and arranged to draw in fresh air through an intake port and compress said fresh air, a fuel supply means for introducing fuel to said compressed fresh air, whereby said compressed fuel and air charges is transferred to said respective combustion chamber, whereby a spark plug is positioned in each of said combustion chambers to ignite said air fuel mixture in each of said combustion chambers to cause rotation of said power rotor, thereby forcing said combustion chamber to increase in volume, and whereby exhaust gas from a previous combustion is positioned on an opposite side of each said power piston forcing said exhaust gas out through an exhaust port positioned in said central power ring, wherein said central power ring is constructed of two substantially similar halves, one being a front engine ring member and an other being a rear engine ring member, each ring member having a substantially C-shaped cross-section with a first seam edge, a second seam edge, and opposite continuous faces of said power rotor therebetween, wherein said first seam edge of said front engine ring member is sealable with said first seam edge of said rear engine ring member, and said second seam edge of said front and said rear engine ring members each includes a sealing ring constructed and arranged to sealably cooperate with opposite faces of said power rotor so as to form said toroid shaped cylinder of said central power ring, wherein said second seam edge of said front engine ring member and rear engine ring member of said central power ring each have a seam edge including a sealing ring constructed and arranged to cooperate with opposite continuous side faces of said power rotor so as to form a seam that seals against gas leakage when combustion force is applied against said seam, and wherein said continuous side faces are beveled to cooperate with said sealing ring.

* * * * *